United States Patent

Patry

[11] Patent Number: 5,446,475
[45] Date of Patent: Aug. 29, 1995

[54] THERMAL PRINT HEAD WITH REGULATION OF THE AMOUNT OF ENERGY APPLIED TO ITS HEATING POINTS

[75] Inventor: Bernard Patry, Orsay, France

[73] Assignee: Axioohm, Montrouge, France

[21] Appl. No.: 70,701

[22] Filed: Jun. 2, 1993

[30] Foreign Application Priority Data

Jun. 3, 1992 [FR] France ............... 92 06718

[51] Int. Cl.⁶ .............. B41J 2/37; B41J 2/36
[52] U.S. Cl. ................................ 347/191
[58] Field of Search ........... 346/7.6 PH; 400/120; 347/191

[56] References Cited

U.S. PATENT DOCUMENTS

| | | | |
|---|---|---|---|
| 4,434,354 | 2/1984 | Nakata | 346/76 PH |
| 4,540,991 | 9/1985 | Kariya et al. | 346/76 PH |
| 5,109,235 | 4/1992 | Sasaki | 346/76 PH |
| 5,257,039 | 10/1993 | Chung et al. | 346/107 R |
| 5,264,868 | 11/1993 | Hadley et al. | 346/107 R |

FOREIGN PATENT DOCUMENTS 9200195  6/1991  WIPO .

OTHER PUBLICATIONS

Patent Abstracts of Japan vol. 11 No. 99(E-493)27 mars 1987 & JP-A-61-248667 (Mitsubishi Electric Corp.) 5 novembre 1986.
Patent Abstracts of Japan vol. 12 No. 190 (M-704) (3037)3 juin 1988 & JP-A-62 299 349 (Fujitsu Ltd) 26 decembre 1987.
Patent Abstracts of Japan vol. 5 No. 61 (M-65) (733 24 avril 1981 & JP-A-5613189 (Nippon Denshin Denwa Kosha) 9 février 1981
Patent Abstracts of Japan vol. 16 No. 87 (M-1217) 3 mars 1992 & JP-A-3268956 (Oki Electric Ind Co Ltd) 29 novembre 1991.
Patent Abstracts of Japan vol. 12 No. 171 (M-700) (3018) 21 mai 1988 & JP-A-62286765 (Fuji Xerox Co Ltd) 12 décembre 1987.
Patent Abstracts of Japan vol. 10 No. 115 (M-474) (2172) 30 avril 1986 & JP-A-60244565 (Konishiroku Shashin Kogyo K.K.) 4 décembre 1985.

Primary Examiner—Huan H. Tran
Attorney, Agent, or Firm—Griffin, Butler Whisenhunt & Kurtossy

[57] ABSTRACT

A thermal print head including a line of electrically resistive heating points and electronic controls for controlling sequential connection to a power supply providing electrical current, and including for each heating point a countdown register which is loaded prior to printing each line of points with a value corresponding to the length of time during which a connection should be maintained with the corresponding heating point starting from a print authorization instant common to all of the points. According to the invention, the print head includes sensors for sensing the resistance of each heating point in real time, which sensors are connected to a circuit for regulating the amount of energy actually supplied to the corresponding point.

3 Claims, 1 Drawing Sheet

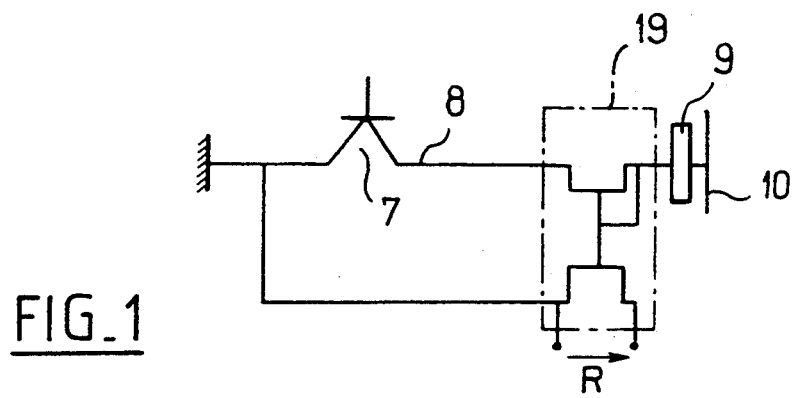
FIG_1
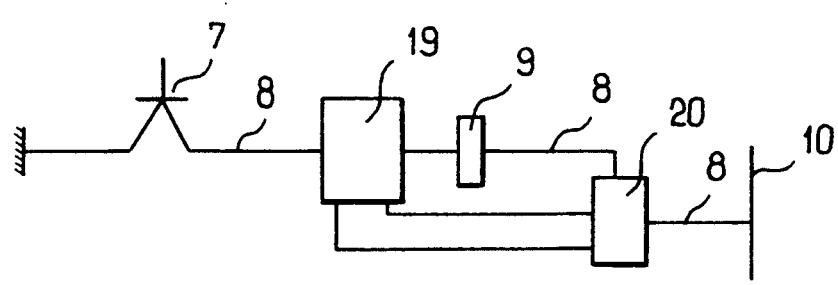
FIG_2
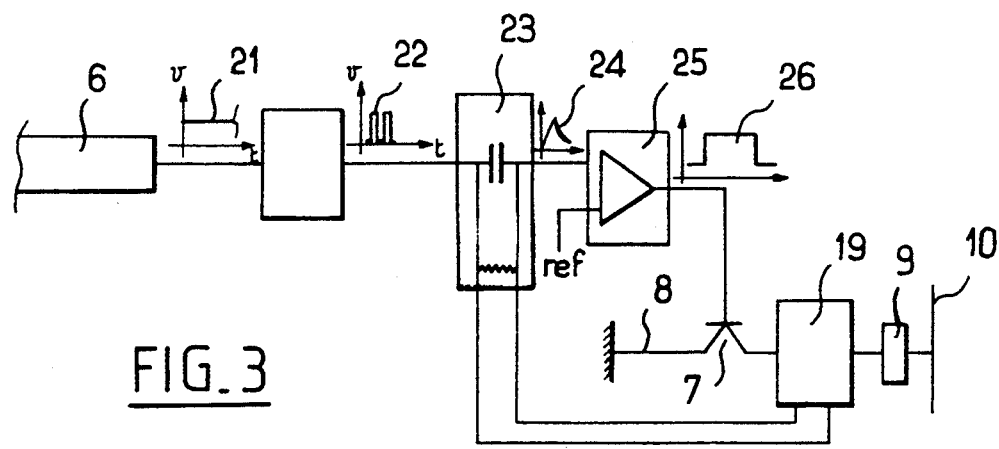
FIG_3
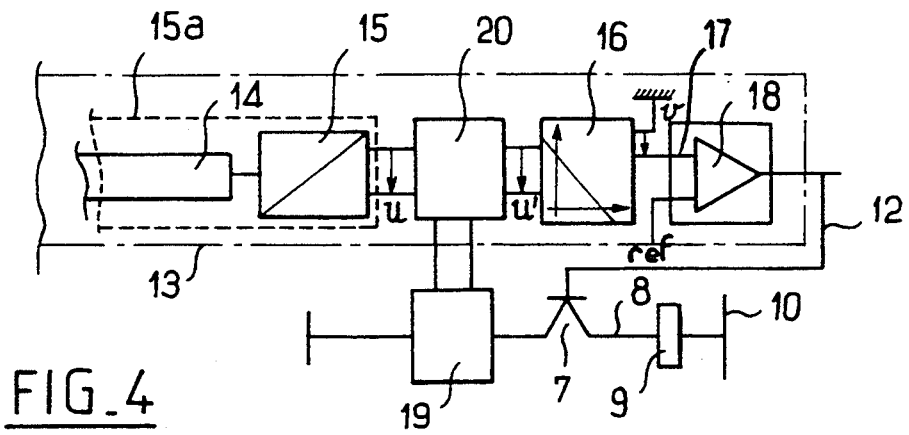
FIG_4

THERMAL PRINT HEAD WITH REGULATION OF THE AMOUNT OF ENERGY APPLIED TO ITS HEATING POINTS

The present invention relates to a thermal print head in which it is possible to adjust the quantity of energy delivered to each heating point or element.

BACKGROUND TO THE INVENTION

A thermal printer relies in using the Joule effect of a resistive point either to vary the color of a heat sensitive medium situated next to said point, or else to cause a dye to be transferred from one medium to another medium by melting or the like.

Technical mastery over materials such as ink and heat sensitive media makes it possible, by adjusting the amount of heat energy given off by the printing point, to obtain shades in the intensity of the colors transferred or in the gray levels obtained.

Unfortunately, on manufacture, the resistance of the heating points is not uniform from one point to another along a line, and it also suffers from drift over time. This uncertainty is of the order of plus or minus 25% about a mean or nominal value, and is a factor that makes it impossible to obtain the desired degree of accuracy in the amount of energy transferred to the sensitive medium for obtaining the desired shade.

Such a thermal print head comprises a line of electrically resistive heating points that may be constituted by a line of discrete points or by a line of "inter-digitated" points, i.e. a line in which there is no physical separation between heating points, the points being constituted by lengths of a continuous resistive line, which points are defined by conductors connected to ground, and have respective conductors connected to the middles thereof for connection to a power supply.

An unsatisfied need therefore exists for a thermal printer capable of producing shaded printing in color or in gray scale. An object of the present invention is to provide a thermal printer of the type outlined above and including a circuit for correcting for the resistance of each point in a line of heating points in order to guarantee printing accuracy with respect to the desired shade, while not degrading operating speed.

SUMMARY OF THE INVENTION

According to the invention, the corrector circuit comprises means for sensing in real time the resistance of each heating point, said means cooperating with an individual circuit for regulating the energy delivered to said point.

There are two ways in which the energy may be regulated: either by acting on the heating time or else by acting on the voltage applied across the terminals of the heating point. When it is desired to modulate the voltage applied to the heating point as a function of its resistance, the means for sensing the resistance are associated with a circuit for weighting the voltage applied to the terminals of the heating point, e.g. a voltage divider.

In contrast, when it is desired to modulate heating time as a function of the resistance of the point, a distinction must be drawn between a digital technique and an analog technique for determining the basic heating time.

Thus, if the countdown registers are digital, then the regulator circuit includes a circuit for subdividing the control signal from each countdown register into a plurality of pulses of width equal to a unit heating time, and a lengthening circuit for lengthening said pulse width, said lengthening circuit being controlled by the measured value of the resistance of the heating point.

In an analog technique, the circuit for regulating energy is a (divider) circuit for weighting the voltage recorded in the analog memory of the analog countdown register, said weighting circuit being controlled by the means for measuring the resistance of the heating point, and being placed in the analog countdown register between said memory and an integrator circuit whose output delivers a variable voltage to a circuit for comparing said voltage with a reference voltage. The comparator circuit delivers a signal for controlling the means for connecting the heating point to a power supply so long as the output voltage from the integrator is greater than a reference voltage. The voltage delivered at the output of the integrator varies linearly as a function of time. The slope of this linear variation is given by the voltage that the integrator receives as its input, i.e. the voltage as weighted by the resistance of the heating point. Consequently, the time during which a signal is present at the output of the comparator circuit is a function of the real resistance of the heating point.

BRIEF DESCRIPTION OF THE DRAWING

Other characteristics and advantages will appear from the following description of two embodiments.

Reference is made to the accompanying drawing, in which:

FIG. 1 is a diagram of a current mirror applied to detecting the resistance of the heating point;

FIG. 2 is a diagram of general means of the invention;

FIG. 3 is a diagram of the means for weighting the control signal from a digital countdown register; and FIG. 4 is a diagram of an analog countdown register including a circuit for modulating the control signal it delivers.

MORE DETAILED DESCRIPTION

FIG. 1 is a diagram of a heating point 9 connected to a common power supply 10, and also to ground via a conductor 8 fitted with a controlled switch which is represented in this case by a transistor 7.

As explained above, the resistance of the heating point 9 is not known accurately, may be different from the resistance of the adjacent heating point, and finally is liable to vary over time. It is therefore necessary to regulate the energy applied to the heating point. According to the invention, this regulation is provided by measuring the magnitude of said resistance in real time. To do this, a known circuit is used for obtaining an image of the resistance of the point. The current mirror principle is applied by means of a circuit 19 for generating an image resistance which is the copy (ignoring a scale factor) of the resistance R of the heating point 9. For example, the circuit 19 may be constituted by an MOS transistor and the image resistance may be the drain-source resistance of the transistor referenced R in FIG. 1. In practice, the drain-source resistance of transistor 7 (which is also an MOS transistor) will be used as the image resistance. The value of this image resistance is then used to act either on the heating time or else on the voltage applied to the terminals of the heating point, so as to define the quantity of energy to be applied to the heating point in order to take account of its resistance.

The invention provides several circuits for achieving this result.

One of these circuits is shown in FIG. 2 and consists in interposing a weighting circuit 20 between the common power supply and the heating point 9 for the purpose of weighing the power supply voltage (e.g. a divider circuit or a multiplier circuit), which circuit is under the control of the image resistance generating circuit 19.

The transistor 7 is switched ON during a length of time corresponding to the value counted down in a countdown register (in conventional manner), said value being calculated to obtain the desired shade on the basis of a nominal value for the resistance 9. In the circuit 20 for weighting the voltage to be applied to the heating point 9, said nominal value is integrated so that by adding the real value of the resistance of the heating point 9 thereto, a weighting coefficient is created which the circuit 20 applies to the voltage delivered to the terminals of said heating point. It may also be observed that since energy varies with the square of voltage, the weighting coefficient will vary with the square root of the difference between the real resistance and the nominal resistance.

FIGS. 3 and 4 are block diagrams showing circuits for regulating the energy applied to the heating point 9 by acting on the time of heating rather than on the voltage applied to the terminals of the point.

Digital countdown register 6 controls the application of a DC signal so long as the count it contains has not reached zero. This DC signal is for controlling transistor 7, and it would be applied directly thereto in the absence of the compensation circuit for compensating the resistance of the point 9. To provide said compensation, said DC signal 21 is split up into a plurality of pulses by means of an appropriate circuit, with the widths of the pulses corresponding to a unit heating time such that the sum of said pulses corresponds to the heating time appropriate for a point whose resistance is equal to the nominal resistance. This sum of pulses is nevertheless smaller than the total time during which the DC signal 21 is present during counting down. The principle then applied consists in regulating the width of the unit pulses so as to take account of the real resistance of the heating point 9 compared with its nominal resistance. Width is regulated by means of an RC circuit 23 in which R corresponds to the real resistance of the heating point and C is a component of given capacitance. The circuit receives a pulse 22 and transforms it into a charge-discharge signal 24. A comparator 25 compares the signal 24 with a reference value and emits a pulse 26 whose width is a function of the time during which the signal 24 is greater than the reference value. It will be understood that this time is a function of the pair RC, and thus of the real resistance of the heating point 9 as generated by the circuit 19. The pulse 26 is a pulse during which the transistor 7 is conductive (ON). The succession of pulses 26 corresponds to the succession of pulses 22, and it switches the transistor 7 ON for a length of time that is modulated relative to the time during which the transistor would have been switched ON had the succession of pulses 22 been applied directly thereto. The amount of energy applied to the heating point 9 is thus regulated by acting on the time during which current passes through said heating point, naturally on the basis of a nominal current-passing time applicable to a nominal resistance of said heating point which determines the width, for example, of the pulses 22.

FIG. 4 shows a circuit that enables the same result to be obtained, namely regulation of the time during which the transistor 7 is switched ON, but by using an analog technique. In FIG. 4, some of the items described above can be seen again, in particular a transistor 7 (which in any case represents any equivalent electronic means), and the conductor 8 connecting a heating point 9 firstly to the transistor 7 and secondly to the common power supply conductor 10. The signal controlling the transistor 7 is applied thereto by a conductor 12, and comes from a control signal generator that is itself under the control of an analog countdown register 13. In the example shown in FIG. 4, this register comprises, integrated on a single chip, either a digital register 14 which contains the value that corresponds to the desired shade for the point 9, which digital value is delivered to a digital-to-analog converter 15 whose output delivers a voltage U corresponding to said digital value 14, or else an analog memory 15a which delivers said voltage of value U directly. The voltage U is delivered to an integrator 16 whose output 17 provides a voltage v that decreases linearly with time. The slope of this decrease is given by the voltage U. Thus, the greater the voltage U, the quicker the fall and the quicker the voltage v reaches a determined lower reference value "ref", e.g. close to 0 volts, said reference value being inserted into a comparator 18 simultaneously with the voltage v. The comparator 18 provides an output signal on conductor 12 so long as the voltage v is greater than the reference value.

It may be observed that according to the invention action is taken via a weighting circuit such as circuit 20 in FIG. 2 that acts on the output voltage 21 from the analog memory 14, 15, 15a prior to application to the integrator 16. The slope of the decreasing linear function of the output voltage from the integrator 16 is thus altered, thereby altering the time during which a signal is present at the output of the comparator 18, and this is done under the influence of the real resistance of the heating point.

Naturally, and as in the preceding examples, this time is regulated about a time that corresponds firstly to the nominal magnitude of the resistance 9 and secondly to the desired color intensity as controlled by the microprocessor in overall control of printing.

I claim:

1. A thermal print head including a line of electrically resistive heating points and electronic control means for controlling sequential connection thereof to an energy supply providing electrical current, and including for each of said heating points a countdown register which is loaded prior to printing each line of points with a value corresponding to a length of time during which a connection should be maintained with said each of said heating points starting from a print authorization instant common to all of the points, wherein each of the heating points of the line is associated with means for sensing a resistance of said each of the heating points in real time and cooperating with an individual circuit for regulating the energy supplied to said each of the heating points of the line, and wherein the circuit for regulating the energy supplied to said each of the heating points of the line is a voltage weighing circuit disposed on an energy supply line for said each of the heating points, and controlled by the means for sensing the resistance of the point.

2. A thermal print head including a line of electrically resistive heating points and electronic control means for controlling sequential connections thereof to an energy supply providing electrical current, and including for each of said heating points an analog countdown register which is loaded prior to printing each line of points with a voltage value corresponding to a length of time during which a connection should be maintained with said each of said heating points starting from a print authorization instant common to all of the points, wherein each of the heating points of the line is associated with means for sensing a resistance of said each of the heating points in real time and cooperating with an individual circuit for regulating the energy supplied to said each of the heating points of the line, and wherein the circuit for regulating the energy supplied to said each of the heating points is a voltage weighing circuit under the control of the means for sensing the resistance of said each of the heating points, said weighing circuit being placed in the analog countdown register between a memory member containing said voltage value and an integrator circuit followed by a comparator, all of which items are included in the analog countdown register.

3. A thermal print head including a line of electrically resistive heating points each having a nominal known resistance and electronic control means for controlling connection means thereof to an energy supply providing electrical current, and including for each of said heating points a digital countdown register which is loaded prior to printing each line of points with a value corresponding to a length of time during which a DC signal is supplied to said connection means at said each of said heating points starting from a print authorization instant common to all of the points, wherein each of the heating points of the line is associated with means for sensing a resistance of said each of the heating points in real time and cooperating with an individual circuit for regulating the energy supplied to said each of the heating points of the line, and wherein the circuit for regulating the energy supplied to said each of the heating points includes a control circuit that provides a plurality of pulses each pulse having a width corresponding to a unit heating time such that the sum of all pulse widths is equal to a time appropriate for properly heating said each of the heating points having said known nominal resistance, and that said sum is smaller than a time during which said DC current is supplied to said connection means, the number of pulses being a function of a value present in the countdown register associated with said each of the heating points and means for regulating said width of each of said pulses as a function of a resistance of said each of the heating points.

* * * * *